2,980,690

NEW BASICALLY SUBSTITUTED BENZYL-BENZIMIDAZOLES

Karl Hoffmann, Binningen, and Alfred Hunger, Jindrich Kebrle, and Alberto Rossi, Basel, Switzerland, assignors, to Ciba Pharmaceutical Products Inc., Summit, N.J.

No Drawing. Filed Nov. 4, 1959, Ser. No. 850,771

Claims priority, application Switzerland Aug. 30, 1957

9 Claims. (Cl. 260—309.2)

This invention provides benzimidazoles of the formula

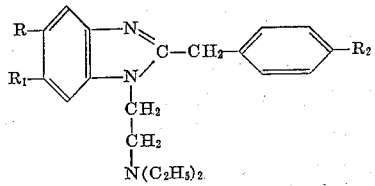

wherein R and $R_1$ stand for a member selected from the group consisting of hydrogen, chlorine and the methyl group, and $R_2$ for a member selected from the group consisting of lower alkoxy, lower alkylmercapto, lower alkyl and lower alkanoyl, said lower alkyl and alkoxy and alkyl mercapto groups being especially methyl, ethyl, propyl, butyl, methoxy, ethoxy, propoxy, butoxy, methylmercapto, ethylmercapto, propylmercapto and butylmercapto, lower alkanoyl particularly acetyl and propionyl, and therapeutically useful acid addition salts thereof.

The new compounds possess good analgesic properties which are superior to those of known benzimidazoles such as described by Novelli, Chem. Abstracts, vol. 49, col. 1021 (1955). They are also blockers of spinal polysynaptic transmission. The new compounds are therefore useful as medicaments especially as analgetics.

The new benzimidazoles can be made by methods in themselves known, for instance by subjecting to ring closure an ortho-(R'—NH)-aniline or an appropriate N-substituted derivative thereof, in which R' represents the β-diethylaminoethyl group or a residue convertible into such group, for example, the β-hydroxyethyl group. The residue convertible into the β-diethylaminoethyl group is subsequently so converted, in the case of the β-hydroxyethyl group, for example, by chlorination and subsequent reaction with diethylamine. Thus, for example, ortho-(β-diethylamino-ethylamino)-aniline may be subjected directly or in stages to ring closure with a para-$R_2$-substituted phenylacetic acid or a reactive functional derivative thereof, especially an ester thereof with an alcohol capable of being split off easily, or an iminoether thereof.

Depending on the procedure used the new compounds are obtained as the free bases or salts thereof. From the salts the free bases can be obtained by methods in themselves known. From the free bases salts can be made by reaction with acids suitable for making therapeutically useful salts for example, hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene or toluene sulfonic acid or a therapeutically active acid.

The starting materials are known or can be made by methods in themselves known.

The new compounds are useful as medicaments, for example, in the form of pharmaceutical preparations which contain the compound or a salt thereof in admixture with a pharmaceutical organic or inorganic, solid or liquid carrier suitable for enteral, parenteral or topical administration. For making the carriers there are used substances which do not react with the new compounds, for example, water, gelatine, lactose, starch, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets, dragees, salves, creams or in liquid form as solutions, suspensions or emulsions. If desired they may be sterilized and/or may contain auxiliary substances, such as preserving, stabilizing, wetting or emulsifying agents, salts for regulating the osmotic pressure or buffers. They may also contain other therapeutically valuable substances.

This is a continuation-in-part application of our applications Serial No. 752,394, filed August 1, 1958; Serial No. 752,404, filed August 1, 1958; Serial No. 753,426, filed August 6, 1958; Serial No. 753,428, filed August 6, 1958; Serial No. 762,229, filed September 22, 1958; and Serial No. 763,436, filed September 26, 1958, all now abandoned.

The following examples illustrate the invention:

Example 1

To a solution of the imino ether hydrochloride of p-methylphenylacetic acid, obtained from 6.56 grams of p-methyl-benzyl cyanide, 2.9 cc. of absolute alcohol and 50 cc. of chloroform by the introduction of dry hydrochloric acid gas at —10° C. and allowing to stand at 25° C. for 16 hours, are added 10.5 grams of 2-(β-diethylamino-ethylamino)-aniline and the whole is stirred for 16 hours under reflux. The reaction mixture is evaporated under vacuum, the residue dissolved in aqueous hydrochloric acid, the acid solution, washed with ether, rendered alkaline with aqueous ammonia, then extracted with chloroform and the chloroform extract, after washing with sodium carbonate solution and drying over magnesium sulfate, evaporated. The residue is distilled at 190–200° C. under 0.2 mm. pressure. From the resulting 1 - (β - diethylamino - ethyl) - 2 - (p - methyl - benzyl)-benzimidazole, an aqueous solution of its hydrochloride can be obtained by dissolving in the calculated quantity of hydrochloric acid.

Example 2

To a solution of the imino ether hydrochloride of p-ethyl phenyl acetic acid obtained from 7.25 grams of p-ethyl-benzyl cyanide, 2.9 cc. of absolute alcohol and 50 cc. of chloroform by the introduction of dry hydrochloric acid gas at —10° C. and allowing to stand at 25° C. for 16 hours, are added 10.35 grams of 2-(β-diethylamino-ethylamino)-aniline and the whole is stirred for 16 hours under reflux. The reaction mixture is evaporated under vacuum, the residue dissolved in aqueous hydrochloric acid, the acid solution, washed with ether, rendered alkaline with aqueous ammonia, then extracted with chloroform and the chloroform extract, after washing with sodium carbonate solution and drying over magnesium sulphate, evaporated. The residue is distilled at 200–210° C. under 0.1 mm. pressure. From the resulting 1-(β-diethylamino-ethyl)-2-(p-ethyl-benzyl)-benzimidazole, an aqueous solution of its hydrochloride can be obtained by dissolving in the calculated quantity of hydrochloric acid.

Example 3

To a solution of the imino ether hydrochloride of p-propylphenyl acetic acid, obtained from 8.0 grams of p-propyl-benzyl cyanide, 2.9 cc. of absolute alcohol and 50 cc. of chloroform by the introduction of dry hydrochloric acid gas at −10° C. and allowing to stand at 25° C. for 16 hours, are added 10.35 grams of 2-(β-diethylamino-ethylamino)-aniline and the whole is stirred for 16 hours under reflux. The reaction mixture is evaporated under vacuum, the residue dissolved in aqueous hydrochloric acid, the acid solution, washed with ether, rendered alkaline with aqueous ammonia, then extracted with chloroform and the chloroform extract, after washing with sodium carbonate solution and drying over magnesium sulfate, evaporated. The residue is distilled at 205–215° C. under 0.2 mm. pressure. From the resulting 1-(β-diethylamino-ethyl) - 2-(p-propyl-benzyl)-benzimidazole, an aqueous solution of its hydrochloride can be obtained by dissolving in the calculated quantity of hydrochloric acid.

The p-propyl-benzyl cyanide required as starting material is prepared in a manner analogous to that of G. S. Skinner et al., J. Am. Chem. Soc. 73, 2230 (1951), from propyl-benzene by way of p-propyl-benzyl chloride (B.P. 112° C. under 15 mm.) and has the boiling point 142° C. under 13 mm. pressure.

Example 4

1 - (β - diethylamino - ethyl) - 2 - (p-acetyl-benzyl)-benzimidazole.—To a solution of the imino ether hydrochloride of p-acetylphenyl acetic acid, obtained from 15.9 grams of p-acetyl-benzyl cyanide, 5.8 ml. of alcohol and 100 ml. of chloroform by the introduction of dry hydrochloric acid gas at −10° C. and allowing to stand at 25° C. for 16 hours, are added 20.7 grams of 2-(β-diethylamino-ethylamino)-aniline and the whole is stirred for 16 hours, under reflux. The reaction mixture is evaporated under vacuum, the residue dissolved in aqueous hydrochloric acid, the acid solution, washed with ether, rendered alkaline with aqueous ammonia, then extracted with chloroform and the chloroform extract, after washing with sodium carbonate solution and drying over magnesium sulfate, evaporated. The resulting crude 1-(β-diethylamino-ethyl) - 2 - (p-acetyl-benzyl)-benzimidazole is converted, by dissolving in alcohol and adding the calculated quantity of alcoholic hydrochloric acid, into its hydrochloride of M.P. 189–190° C.

Example 5

20.7 grams of 2-(β-diethylamino-ethylamino)-aniline are added dropwise to a solution in chloroform of the iminoether hydrochloride of para-ethoxy-phenylacetic acid, obtained from 16.1 grams of para-ethoxy-benzyl cyanide and 5.8 ml. of absolute alcohol in 100 ml. of chloroform by introducing dry hydrogen chloride gas at −10° C. and allowing the whole to stand at 25° C. for 16 hours. The whole is then boiled under reflux for 16 hours. The reaction mixture is extracted with aqueous hydrochloric acid, the acid solution is rendered alkaline with ammonia solution, then extracted with chloroform, and the extract is evaporated, after being washed with sodium carbonate solution and dried with magnesium sulfate. The 1 - (β - diethylaminoethyl)-2-(para-ethoxybenzyl) - benzimidazole so obtained melts at 65–66° C. after recrystallization from ether.

The hydrochloride, obtained by dissolving the base in alcohol, adding two equivalents of alcoholic hydrochloric acid and concentrating the mixture, melts at 118–120° C.

Example 6

20.7 grams of 2-(β-diethylamino-ethylamino)-aniline are added to a solution of the imino-ether hydrochloride of para-methoxy-phenylacetic acid, obtained from 14.7 grams of para-methoxy-benzyl cyanide, 5.8 cc. of absolute alcohol in 100 cc. of chloroform by the introduction of dry hydrogen chloride gas at −10° C. and allowing the whole to stand at 25° C. for 16 hours. The whole is then boiled under reflux for 16 hours. The reaction mixture is evaporated in vacuo, the residue is dissolved in aqueous hydrochloric acid, the acid solution is washed with ether, rendered alkaline with aqueous ammonia solution, extracted with chloroform, and the extract solution is evaporated after being washed with sodium carbonate solution and dried with magnesium sulfate. The crude 1-(β-diethylaminoethyl)-2-(para-methoxybenzyl) - benzimidazole so obtained is converted into its hydrochloride, melting at 150–151° C. by dissolving the crude base in alcohol and adding one equivalent of alcoholic hydrochloric acid.

Example 7

6.21 grams of 2-(β-diethylamino-ethylamino)-aniline are added to a solution of the imino-ether hydrochloride of para-propyloxy-phenylacetic acid obtained from 5.25 grams of para-propyloxy-benzyl cyanide, 1.73 cc. of absolute alcohol in 40 cc. of chloroform by introducing dry hydrogen chloride gas at −10° C. and allowing the whole to stand for 16 hours at 25° C. and then the whole is boiled under reflux for 16 hours while stirring. The reaction mixture is evaporated in vacuo, the residue is taken up in aqueous hydrochloric acid, and the acid solution is washed with ether, rendered alkaline with ammonia solution, extracted with chloroform, and the chloroform extract is washed with sodium carbonate solution, dried with magnesium sulfate, and evaporated. The crude 1-(β-diethyl-aminoethyl)-2-(para-propyloxy-benzyl) - benzimidazole so obtained is converted into its hydrochloride, melting at 115–116° C., by dissolving the base in alcohol and adding two equivalents of alcoholic hydrochloric acid.

Example 8

6.21 grams of 2-(β-diethylamino-ethylamino)-aniline are added to a solution of the imino-ether hydrochloride of para - butyloxy - phenylacetic acid, obtained from 5.68 grams of para - butyloxy - benzyl cyanide (prepared as described in our patent application Ser. No. 684,860, filed September 19, 1957). 1.73 cc. of absolute alcohol and 40 cc. of chloroform by introducing dry hydrogen chloride gas at −10° C. and allowing the mixture to stand for 16 hours at 25° C. The whole is then boiled under reflux for 16 hours while stirring. The reaction mixture is evaporated in vacuo, the residue is taken up in aqueous hydrochloric acid, the acid solution is extracted with ether, rendered alkaline with aqueous ammonia, extracted with chloroform, and the chloroform extract is washed with sodium carbonate solution, dried over magnesium sulfate, and evaporated. The crude 1-(β - diethylaminoethyl) - 2 - (para - butyloxy - benzyl)-benzimidazole so obtained is converted into its hydrochloride, melting at 129–130° C., by dissolving the base in alcohol and adding one equivalent of alcoholic hydrochloric acid.

Example 9

To a solution of the imino ether hydrochloride of p-ethoxy-phenyl acetic acid, obtained from 8.05 grams of p-ethoxy-benzyl cyanide, 2.9 cc. of absolute alcohol and 50 cc. of chloroform by the introduction of dry hydrochloric acid gas at −10° C. and allowing to stand at 25° C. for 16 hours, are added 12.0 grams of 2-(β-diethylamino-ethylamino)-5-chloraniline and the whole is stirred for 16 hours under reflux. The reaction mixture is evaporated under vacuum, the residue dissolved in aqueous hydrochloric acid, the acid solution washed with ether, rendered alkaline with aqueous ammonia, then extracted with chloroform extract, after washing with sodium carbonate solution and drying over magnesium sulfate, evaporated. The residue of crude 1-(β-diethylaminoethyl)-2-(p-ethoxy-benzyl) - 5 - chloro-benzimidazole is converted into the hydrochloride of M.P. 205–207° C. by dissolving in alcohol and adding two equivalents of alcoholic hydrochloric acid.

The 2-(β-diethylamino-ethylamino)-5-chloraniline required as starting material can be prepared as follows:

200 grams of 2:5-dichlornitrobenzene are introduced slowly with stirring at 140–150° C. into 300 cc. of β-diethylamino-ethylamine and then stirring continued for a further 2 hours at 140–150° C. The whole is then cooled to 70° C. and poured into ice water. The separated 2-(β-diethylamino-ethylamino)-5-chloronitrobenzene, after recrystallization from methanol-water, melts at 51–52° C.

48 grams of 2-(β-diethylamino-ethylamino)-5-chloronitrobenzene, dissolved in 500 cc. of alcohol, are shaken in a hydrogen atmosphere with 5 grams of Raney nickel catalyst at 25° C. After 12 liters of hydrogen have been taken up the process is interrupted and the product filtered from catalyst, evaporated under vacuum and the crude 2-(β-diethyl-amino-ethylamino)-5-chloroaniline distilled at 132–137° C. under 0.15 mm. pressure.

Example 10

To a solution of the imino ether hydrochloride of p-methoxy-phenyl acetic acid obtained from 7.4 grams of p-methoxy-benzyl cyanide, 2.9 cc. of absolute alcohol and 50 cc. of chloroform by the introduction of dry hydrochloric acid gas at —10° C. and allowing to stand at 25° C. for 16 hours, are added 12.0 grams of 2-(β-diethyl-amino-ethylamino)-5-chloraniline and the whole is stirred for 16 hours under reflux. The reaction mixture is evaporated under vacuum, the residue dissolved in aqueous hydrochloric acid, the acid solution, washed with ether, rendered alkaline with aqueous ammonia, then extracted with chloroform and the chloroform extract, after washing with sodium carbonate solution and drying over magnesium sulfate, evaporated. The resulting 1-(β-diethylamino - ethyl) - 2 - (p - methoxy - benzyl) - 5 - chlorobenzimidazole is converted into its hydrochloride of M.P. 183–184° C. by dissolving in alcohol and adding one equivalent of alcoholic hydrochloric acid.

Example 11

A solution consisting of 5.88 grams of para-methoxy-benzyl-cyanide, 2.32 ml. of absolute alcohol and 40 cc. of chloroform, is saturated with dry hydrochloric acid gas at 0° C., and allowed to stand for 12 hours at room temperature. 8.3 grams of 2-(β-diethylamino-ethylamino)-4:5-dichloroaniline dissolved in 50 ml. of chloroform are added and the whole is boiled under reflux for 12 hours. The chloroform solution is evaporated, the residue is agitated with a mixture of 50 ml. of water, 5 ml. of concentrated ammonia solution and 150 ml. of ether. The ether extract is washed with water and extracted three times with 30 ml. of 1 N-hydrochloric acid. The hydrochloric acid extract is rendered alkaline with sodium hydroxide solution and the liberated base taken up in ether, dried and evaporated. By taking it up in a little ethanol and adding one equivalent of alcoholic hydrochloric acid, 1-(β - diethylamino - ethyl) - 2 - (para - methoxy - benzyl)-5:6-dichloro-benzimidazole hydrochloride melting at 220° C. is obtained.

Example 12

A solution consisting of 3.2 grams of para-ethoxybenzyl cyanide, 1.16 ml. of absolute alcohol and 20 ml. of chloroform is satuarted with dry hydrochloric acid gas at 0° C. and allowed to stand for 12 hours at room temperature. 5.5 grams of 2-(β-diethylamino-ethylamino)-4:5-dichloro-aniline in 50 ml. of chloroform are added and the whole is boiled under reflux for 12 hours. The chloroform solution is evaporated, and the residue agitated with a mixture of 30 cc. of water, 5 cc. of concentrated ammonia solution and 100 cc. of ether. The ether extract is washed with water and extracted three times with 20 cc. of 1 N-hydrochloric acid. The hydrochloric acid extract is rendered alkaline with sodium hydroxide solution and the liberated based taken up in ether, the ether solution dried and evaporated. By taking it up in a little alcohol and adding one equivalent of alcoholic hydrochloric acid 1 - (β - diethylamino-ethyl)-2-(para-ethoxy-benzyl)-5:6-dichloro-benzimidazole hydrochloride melting at 115° C. is obtained.

Example 13

7.2 grams of 2-(β-diethylamino-ethylamino)-5-chloraniline are added to a solution of the imino-ether hydrochloride of para-methyl-phenylacetic acid, which has been obtained from 3.95 grams of para-methyl-benzyl cyanide, 1.75 cc. of absolute alcohol and 30 cc. of chloroform by introducing dry hydrochloric acid gas at —10° C. and allowing the whole to stand for 16 hours at 25° C., and then the whole is stirred under reflux for 16 hours. The reaction mixture is evaporated in vacuo, the residue is dissolved in aqueous hydrochloric acid, the acid solution is washed with ether, rendered alkaline with aqueous ammonia, extracted with chloroform and the chloroform solution is washed with sodium carbonate solution, dried over magnesium sulfate and evaporated. The crude 1-(β-diethylamino - ethyl) - 2 - (para - methyl - benzyl) - 5-chloro-benzimidazole so obtained is dissolved in alcohol and converted into its hydrochloride crystallizing as solvate by the addition of one equivalent of alcoholic hydrochloric acid, the hydrochloride melting at 90–110° C.

Example 14

24 grams of 2-(β-diethylamino-ethylamino)-5-chloraniline are added to a solution of the imino-ether hydrochloride of para-ethyl-phenylacetic acid, which has been obtained from 14.5 grams of para-ethyl-benzyl cyanide, 5.8 cc. of absolute alcohol and 100 cc. of chloroform by introducing dry hydrochloric acid gas at —10° C. and allowing the whole to stand for 16 hours at 25° C., and then the whole is stirred for 16 hours under reflux. The reaction mixture is evaporated in vacuo, the residue dissolved in aqueous hydrochloric acid, the acid solution washed with ether, rendered alkaline with aqueous ammonia, extracted with chloroform and the chloroform extract is washed with sodium carbonate solution, dried over magnesium sulfate and evaporated. The resulting crude 1-(β-diethylamino - ethyl) - 2 - (para - ethyl - benzyl) - 5-chloro-benzimidazole is distilled in a bulb tube at 190–200° C. and under 0.1 pressure of mercury as a colorless viscous oil. By neutralization with the calculated quantity of hydrochloric acid an aqueous solution of the hydrochloride can be prepared.

Example 15

3.93 grams of para-methyl-benzyl cyanide in 1.75 cc. of ethanol and 40 cc. of chloroform are saturated with dry hydrochloric acid gas at 0° C. and the whole allowed to stand for 12 hours at room temperature. 4.14 grams 2 - (β - diethylamino - ethylamino)-4:5-dichloraniline are added to the mixture, the whole is boiled under reflux for 12 hours and evaporated. The residue is taken up in a mixture of 50 cc. of 2 N-aqueous ammonia solution and 250 cc. of ethyl acetate. The organic layer is extracted with 50 cc. of 2 N-sulfuric acid. From the aqueous layer the base is liberated with sodium hydroxide solution, taken up in ethyl acetate, dried and freed from the solvent. The resulting 1-(β-diethylamino-ethyl) - 2 - (para-methyl-benzyl)-5:6-dichloro-benzimidazole is converted into its hydrochloride melting at 235° C. by being dissolved in alcohol and adding one equivalent of alcoholic hydrochloric acid.

Example 16

4.8 grams of para-(n)-propyl-benzyl cyanide in 1.75 cc. of ethanol and 40 cc. of chloroform are saturated at 0° C. with dry hydrochloric acid gas and the whole is allowed to stand for 12 hours at room temperature. 4.14 grams of 2-(β-diethylamino-ethylamino)-4:5-dichloraniline are added and the mixture is boiled under reflux for 12 hours and evaporated. The residue is taken up in a mixture of 50 cc. of 2 N-aqueous ammonia solution and 250 cc. of ethyl acetate. The ethyl acetate layer is extracted with 5 cc. of 2 N-sulfuric acid. From the aqueous layer the base is liberated with sodium hydroxide solution, taken up in ethyl acetate, dried and freed from the solvent. The resulting 1 - (β - diethyl-amino-ethyl) - 2 - (para-(n)-propyl-benzyl)-5:6-dichloro-benzimidazole is converted into its hydrochloride melting at 160° C. by being dissolved in alcohol and adding the calculated quantity of alcoholic hydrochloric acid.

Example 17

13.5 grams of 2-(β-diethylamino-ethylamino)-5-chloraniline are added to a solution of the imino-ether hydrochloride of para-acetyl-phenylacetic acid, which has been obtained from 9.0 grams of para-acetyl-benzyl cyanide, 80 cc. of chloroform and 3.25 cc. of absolute alcohol by introducing dry hydrochloric acid gas at −10° C. and allowing the whole to stand for 44 hours at 25° C., and then the whole is stirred under reflux for 16 hours. The reaction mixture is evaporated in vacuo, the residue dissolved in aqueous hydrochloric acid, the acid solution washed with ether is rendered alkaline with aqueous ammonia, extracted with chloroform and the chloroform extract washed with sodium carbonate solution, dried over magnesium sulfate and evaporated. The resulting crude 1-(β-diethylamino-ethyl)-2-(para-acetyl-benzyl)-5-chloro-benzimidazole can be converted into the crystalline hydrochloride melting at 195–196° C. by being dissolved in alcohol and adding the calculated quantity of alcoholic hydrochloric acid.

Example 18

6.7 grams of 2-(β-diethylamino-ethylamino)-5-methylaniline are added to a solution of the imino-ether hydrochloride of para-methyl-phenylacetic acid, (which has been obtained from 3.95 grams of para-methyl-benzyl-cyanide, 1.75 cc. of absolute alcohol and 30 cc. of chloroform by introducing dry hydrogen chloride gas into the mixture at −10° C. and allowing the whole to stand for 16 hours at 25° C.), and the whole is boiled under reflux for 24 hours while stirring. The reaction mixture is evaporated in vacuo, the residue is dissolved in aqueous hydrochloric acid, the acid solution is washed with ethyl acetate, then rendered alkaline with ammonia, extracted with ethyl acetate, the ethyl acetate extract solution is washed with sodium carbonate solution and dried over magnesium sulfate, and then evaporated. The resulting crude 1-(β-diethylamino - ethyl)-2-(para-methyl-benzyl)-5-methyl-benzimidazole is converted into its hydrochloride melting at 151–153° C. by dissolution in alcohol and the addition of the calculated quantity of hydrochloric acid in ethyl acetate.

The 2-(β-diethylaminoethylamino) - 5 - methyl - aniline used as starting material can be prepared as follows:

68.6 grams of 3-nitro-4-chlorotoluene are slowly introduced while stirring at 130° C. into 92.8 grams of β-diethylamino-ethylamine, and then the whole is stirred for a further 3 hours at 150° C. The mixture is then cooled to 70° C. and poured into a cold aqueous solution of caustic soda. The mixture is extracted with ether, and the ethereal solution is washed with water and dried over magnesium sulfate. After distilling off the solvent, the residue is distilled in a high vacuum, whereby 2-(β-diethylamino-ethylamino)-5-methyl nitrobenzene is obtained in the form of a thickly liquid red oil boiling at 140–145° C. under 0.05 Tor.

87 grams of 2-(β-diethylamino-ethylamino)-5-methyl-nitrobenzene, dissolved in 500 cc. of alcohol, are agitated in an atmosphere of hydrogen with 5 grams of Raney nickel at 25° C. When 24.5 liters of hydrogen have been absorbed, the hydrogenation is interrupted, the catalyst is filtered off, the filtrate is evaporated in vacuo, and the crude 2-(β-diethylamino-ethylamino)-5-methyl-aniline is distilled at 128–132° C. under 0.06 Tor.

Example 19

11 g. of 2-(β-diethylamino-ethylamino)-5-methylaniline are added to a solution of the imino ether hydrochloride of para-acetyl-phenyl acetic acid obtained from 8.0 g. of para-acetylbenzyl cyanide, 2.9 ml. of absolute alcohol in 50 ml. of chloroform by introducing dry hydrogen chloride gas at −10° C. and allowing the reaction mass to stand at 25° C. for 16 hours. The whole is boiled under reflux for 18 hours. It is then evaporated and the residue taken up in hydrochloric acid, the acid solution extracted with ether and rendered alkaline with aqueous ammonia, extracted with chloroform, the extract washed with sodium carbonate solution and dried over magnesium sulfate, and evaporated. The resulting crude 1-(β-diethylamino-ethyl)-2-(para-acetylbenzyl) - 5 - methyl-benzimidazole is converted into the hydrochloride of melting point 178–179° C. by dissolving it in alcohol and adding the calculated quantity of alcoholic hydrochloric acid.

6 g. of 1-(β - diethylamino - ethyl) - 2 - (para - acetyl-benzyl)-5-methyl-benzimidazole-hydrochloride are dissolved in 200 ml. of 90% methanol and 3 g. of sodium borohydrate introduced slowly. When the reaction has subsided, the reaction mass is refluxed for 3 hours. It is then evaporated under reduced pressure, the residue taken up carefully in hydrochloric acid, extracted with ether, and the acid aqueous solution rendered alkaline with ammonia. The solution is then extracted with chloroform and the extract washed with sodium carbonate solution, dried over magnesium sulfate, and evaporated. The resulting 1-(β-diethylamino ethyl-2-[para-(1'-hydroxy-ethyl)-benzyl]-5-methyl-benzimidazole melts at 136° C.

4 g. of 1-(β-diethylamino-ethyl)-2-[para-(1'-hydroxyethyl)-benzyl]-5-methyl-benzimidazole are refluxed for 14 hours in 100 ml. of 47% hydriodic acid in the presence of 3 g. of red phosphorus. The reaction mass is filtered, concentrated under reduced pressure, the concentrated solution rendered alkaline with sodium hydroxide solution, extracted with chloroform, the extract dried over magnesium sulfate, and evaporated. The residue is taken up in alcohol and agitated in an atmosphere of hydrogen in the presence of a platinum catalyst until no more gas is taken up, then filtered and evaporated. The residue is taken up in hydrochloric acid, extracted with ether, the aqueous solution rendered alkaline with ammonia, extracted with chloroform, the solution washed with sodium carbonate solution and dried over magnesium sulfate, and evaporated. The resulting crude 1-(β-diethylamino-ethyl) - 2 - (para-ethylbenzyl) - 5 - methyl-benzimidazole distils in a bulb tube at 180–190° C. under a pressure of 0.02 mm. An aqueous solution of the hydrochloride can be obtained by mixing the base.

Example 20

A mixture of 7.86 of para-methyl-benzyl-cyanide, 3.5 ml. of ethanol and 100 ml. of chloroform is saturated with dry hydrogen chloride gas at 0° C., allowed to stand at room temperature for 12 hours, then admixed with 6.8 g. of 2-amino-4:5-dimethyl-aniline, and boiled under reflux for 12 hours.

After cooling, the reaction mixture is vigorously agitated with 100 ml. of N-aqueous ammonia solution, the clear chloroform layer is separated, dried with magnesium sulfate, evaporated, and the residue recrystallized from ethyl acetate.

The resulting 2-(para-methyl-benzyl)-5:6-dimethyl-benzimidazole melts at 200° C.

2.5 g. of 2-(para-methyl-benzyl)-5:6-dimethyl-benzimidazole, dissolved in 50 ml. of dioxane are mixed with 0.4 g. of sodamide at 70° C. At the same temperature, 1.4 g. of β-diethylamino-ethyl chloride, dissolved in 10 ml. of dioxane are added dropwise in the course of half an hour. When the addition is complete, the reaction mixture is kept at 70° C. for 2 hours and, after the addition of animal charcoal, filtered while hot, evaporated, and the residue taken up in 100 ml. of ether.

The ethereal extract is extracted with aqueous hydrochloric acid, the aqueous layer rendered alkaline with caustic soda solution, and extracted with ether. The extract is dried with magnesium sulfate and evaporated, and the crude 1-($\beta$-diethylaminoethyl)-2-(para-methyl-benzyl)-5:6-dimethyl-benzimidazole which remains behind is distilled in a bulb tube at 180–190° C. under a pressure of 0.01 mm. to obtain a viscous oil. By dissolving the latter in the calculated quantity of aqueous hydrochloric acid an aqueous solution of its hydrochloride can be prepared.

Example 21

To a solution of the imino-ether hydrochloride of para-ethoxy-phenyl acetic acid, which has been obtained from 8.05 grams of para-ethoxy-benzyl cyanide, 2.9 cc. of absolute alcohol and 60 cc. of chloroform by introducing dry hydrogen chloride gas into the mixture at −10° C. and allowing the whole to stand for 16 hours at 25° C., there are added 11.1 grams of 2-($\beta$-diethylamino-ethylamino)-5-methyl-aniline and the whole is boiled for 16 hours under reflux while stirring. The reaction mixture is then evaporated in vacuo, the residue is dissolved in aqueous hydrochloric acid, the acid solution is washed with ethyl acetate, then rendered alkaline with aqueous ammonia, extracted with ethyl acetate, and the ethyl acetate extract is washed with sodium carbonate solution, dried over magnesium sulfate and evaporated. The residue is distilled in a high vacuum, whereby 1-($\beta$-diethylaminoethyl)-2-(para-ethoxy-benzyl)-5-methyl-benzimidazole is obtained in the form of a slightly yellow thickly liquid oil boiling at 200–205° C. under 0.05 Tor.

A dihydrochloride of the base melting at 93–95° C. is obtained by reacting an alcoholic solution of the base with two equivalents of hydrochloric acid in ethyl acetate.

The 2-($\beta$-diethylamino-ethylamino)-5-methyl-aniline used as starting material may be prepared as follows:

68.6 grams of 3-nitro-4-chlorotoluene are slowly introduced while stirring at 130° C. into 92.8 grams of $\beta$-diethylamino-ethylamine, and then the whole is stirred for a further 3 hours at 150° C. The mixture is then cooled to 70° C. and poured into a cold aqueous solution of caustic soda. The whole is extracted with ether and the ethereal solution is washed with water and dried over magnesium sulfate. After distilling off the solvent, the residue is distilled in a high vacuum whereby 2-($\beta$-diethylamino-ethylamino)-5-methyl-nitrobenzene is obtained as a thickly liquid red oil boiling at 140–145° C. under 0.05 Tor.

87 grams of 2-($\beta$-diethylamino-ethylamino)-5-methyl-nitrobenzene, dissolved in 500 cc. of alcohol, are agitated in an atmosphere of hydrogen with 5 grams of Raney nickel at 25° C. When 24.5 liters of hydrogen have been absorbed the hydrogenation is interrupted, the catalyst is filtered off, the filtrate is evaporated in vacuo, and the crude 2-($\beta$-diethylamino-ethylamino)-5-methyl-aniline is distilled at 128–132° C. under 0.06 Tor.

Example 22

To a solution of the imino-ether hydrochloride of para-ethoxy-phenylacetic acid, which has been obtained from 6.5 grams of para-ethoxy-benzyl cyanide, 2.3 cc. of absolute alchool and 50 cc. of chloroform by introducing dry hydrogen chloride gas into the mixture at −10° C. and allowing the whole to stand for 16 hours at 25° C., there are added 8.8 grams of 2-($\beta$-diethylamino-ethylamino)-4-methyl-aniline, and the whole is boiled under reflux for 24 hours while stirring. The reaction mixture is evaporated in vacuo, the residue is dissolved in aqueous hydrochloric acid, the acid solution is washed with ethyl acetate and rendered alkaline with aqueous ammonia, then extracted with chloroform and the chloroform extract is washed with sodium carbonate solution, dried over magnesium sulfate and evaporated. The residue is distilled in a high vacuum, whereby 1-($\beta$-diethylamino-ethyl)-2-(para-ethoxy-benzyl)-6-methyl-benzimidazole is obtained in the form of a slightly yellow thickly liquid oil boiling at 210–215° C. under 0.05 Tor. The hydrochloride of the base melting at 170–173° C. is obtained by reacting an alcoholic solution of the base with 1 equivalent of hydrochloric acid in ethyl acetate.

The 2-($\beta$-diethylamino-ethylamino)-4-methyl-aniline used as starting material is prepared by the method used in Example 1 for preparing 2-($\beta$-diethylamino-ethylamino)-5-methylaniline, by using 3-chloro-4-nitrotoluene and $\beta$-diethylamino-ethylamine as starting materials, and the product is a slightly yellow oil boiling at 114–118° C. under 0.03 Tor.

Example 23

To a solution of the iminoether hydrochloride of para-methylmercapto-phenylacetic acid, which has been obtained from 4.9 grams of para-methylmercapto-benzyl cyanide, 1.75 cc. of absolute alcohol and 30 cc. of chloroform by introducing into the mixture dry hydrogen chloride gas at −10° C. and allowing the whole to stand for 16 hours at 25° C., there are added 6.7 grams of 2-($\beta$-diethylamino-ethylamino)-5-methyl-aniline, and the whole is boiled under reflux for 24 hours while stirring. The reaction mixture is evaporated in vacuo, the residue is dissolved in aqueous hydrochloric acid, the acid solution is washed with ethyl acetate and rendered alkaline with aqueous ammonia, then extracted with ethyl acetate, and the ethyl acetate extract solution is washed with sodium carbonate solution and dried over magnesium sulfate and evaporated. The residue is distilled in a high vacuum, whereby 1-($\beta$-diethylamino-ethyl)-2-(para-methyl-mercapto-benzyl)-5-methyl-benzimidazole is obtained in the form of a slightly yellow thickly liquid oil boiling at 210–215° C. under 0.02 Tor.

The base is dissolved in alcohol and its hydrochloride melting at 205–207° C. is obtained by adding one equivalent of hydrochloric acid in ethyl acetate.

The para-methylmercapto-benzyl-cyanide used as starting material is prepared as follows:

26 grams of para-methylmercapto-benzyl chloride are boiled, while stirring, in 150 cc. of acetone with 21.5 grams of potassium cyanide and 1 gram of potassium iodide for 16 hours. After filtering the mixture and evaporating the filtrate, the residue is taken up in ether and the ethereal solution is washed with water. The ethereal solution is then dried with magnesium sulfate, and evaporated to yield para-methylmercapto-benzyl cyanide boiling at 116–120° C. under 0.07 Tor. and melting at 44–45° C.

Example 24

2.4 grams of sodamide are introduced in portions into a stirred suspension of 14 grams of 2-(para-ethoxy-benzyl)-5:6-dimethyl-benzimidazole in 100 ml. of absolute dioxane, and the mixture is boiled under reflux until the evolution of ammonia can no longer be detected. 8.2 grams of chlor-ethyl-diethylamine are then slowly introduced dropwise at 60–70° C., and the whole is stirred for a further 16 hours at that temperature. Residual sodamide is decomposed by introducing alcohol dropwise, the reaction mixture is evaporated, the residue is taken up in dilute hydrochloric acid, the acid solution is filtered to remove unreacted starting material, and the filtrate is extracted with ether, rendered alkaline with aqueous ammonia and extracted with chloroform. The chloroform extract solution is washed with sodium carbonate solution and dried over magnesium sulfate, and is evaporated to yield crude 1-($\beta$-diethylamino-ethyl)-2-(para-ethoxy-benzyl)-5:6-dimethylbenzimidazole. By dissolving the latter in alcohol and adding the calculated quantity of alcoholic hydrochloric acid, the crystalline hydrochloride melting at 167–168° C. is obtained.

The 2-(para-ethoxy-benzyl)-5:6-dimethyl-benzimidazole used as starting material may be prepared as follows:

The imino-ether hydrochloride of para-ethoxyphenylacetic acid (obtained from 14.5 grams of para-ethoxy benzyl cyanide and 5.8 ml. of alcohol in 100 ml. of chloroform by introducing dry hydrogen chloride into the mixture at −10° C., allowing the mixture to stand for 16 hours at 25° C., and evaporating the mixture in vacuo) is boiled under reflux with 13.6 grams of 2-amino-4:5-dimethylaniline in 100 ml. of chloroform for 6 hours while stirring. The reaction mixture is evaporated in vacuo, the residue is taken up in sodium carbonate solution, and the precipitated 2-(para-ethoxy-benzyl)-5:6-dimethylbenzimidazole is filtered off with suction. After recrystallization from ethanol, the product melts at 205–206° C.

*Example 25*

To a solution of the iminoether hydrochloride of para-methoxy-phenylacetic acid, which has been obtained from 7.5 grams of para-methoxy-benzyl cyanide, 2.9 cc. of absolute alcohol and 50 cc. of chloroform by introducing into the mixture dry hydrogen chloride gas at −10° C. and allowing the whole to stand for 14 hours at 25° C., there are added 11 grams of 2-(β-diethylamino-ethylamino)-5-methyl-aniline, and the whole is boiled under reflux for 18 hours with stirring. The reaction mixture is evaporated, taken up in aqueous hydrochloric acid, the acid aqueous solution extracted with ether is rendered alkaline with aqueous ammonia, extracted with chloroform, and the chloroform extract washed with sodium carbonate solution, dried with magnesium sulfate and evaporated. The resulting crude 1-(β-diethylamino-ethyl)-2-(para-methoxy-benzyl)-5-methyl-benzimidazole is converted into the hydrochloride melting at 147–148° C. by being dissolved in alcohol and adding the calculated quantity of alcoholic hydrochloric acid.

What is claimed is:

1. Benzimidazoles of the formula

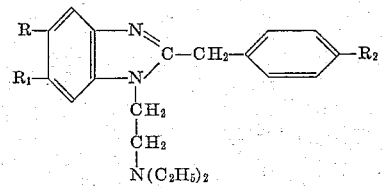

wherein R and $R_1$ stand for a member selected from the group consisting of hydrogen, chlorine and the methyl group, and $R_2$ for a member selected from the group consisting of lower alkoxy, lower alkylmercapto, lower alkyl and lower alkanoyl, and their therapeutically useful acid addition salts.

2. 1-(β-diethylaminoethyl)-2-para-n-propyl-benzyl)-benzimidazole.

3. 1-(β-diethylaminoethyl)-2-(para-ethoxy-benzyl)-benzimidazole.

4. 1-(β-diethylaminoethyl)-2-(para-ethoxy-benzyl)-5-chloro-benzimidazole.

5. 1-(β-diethylaminoethyl)-2-(para-ethoxy-benzyl)-5,6-dichloro-benzimidazole.

6. 1-(β-diethylaminoethyl)-2-(para-acetyl-benzyl)-5-methyl-benzimidazole.

7. 1-(β-diethylaminoethyl)-2-(para-ethoxy-benzyl)-6-methyl-benzimidazole.

8. 1-(β-diethylaminoethyl)-2-(para-methylmercapto-benzyl)-5-methyl-benzimidazole.

9. 1-(β-diethylaminoethyl)-2-(para-ethoxy-benzyl)-5,6-dimethyl-benzimidazole.

References Cited in the file of this patent

UNITED STATES PATENTS 2,689,853     Schenck et al. _____ Sept. 21, 1954

OTHER REFERENCES

Wright: J. Am. Chem. Soc., vol. 71, pp. 2035–2037 (1949).

Novelli: Chem. Abstracts, vol. 49, col. 1021 (1955).